UNITED STATES PATENT OFFICE.

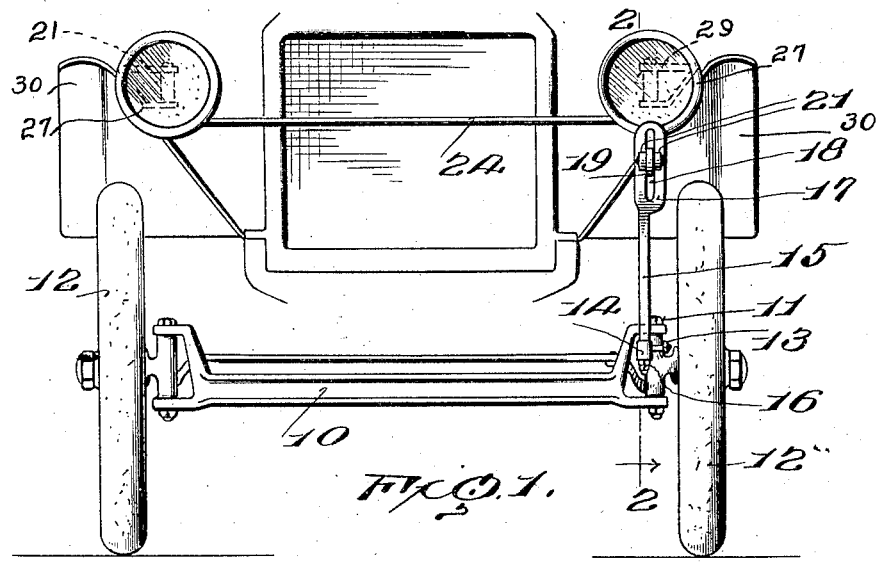
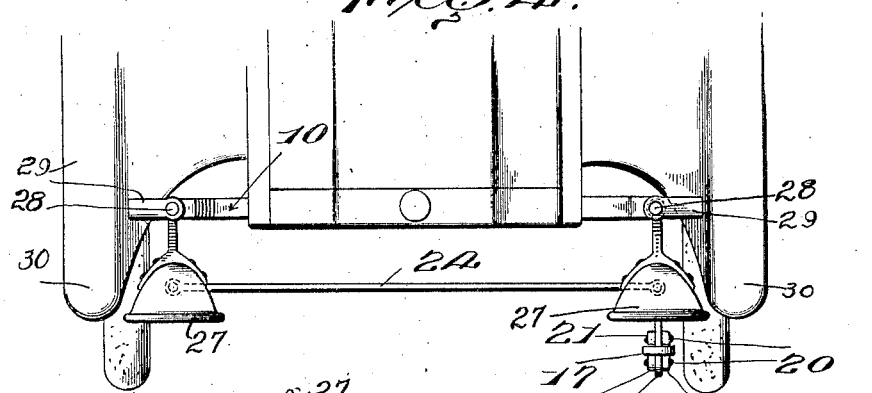
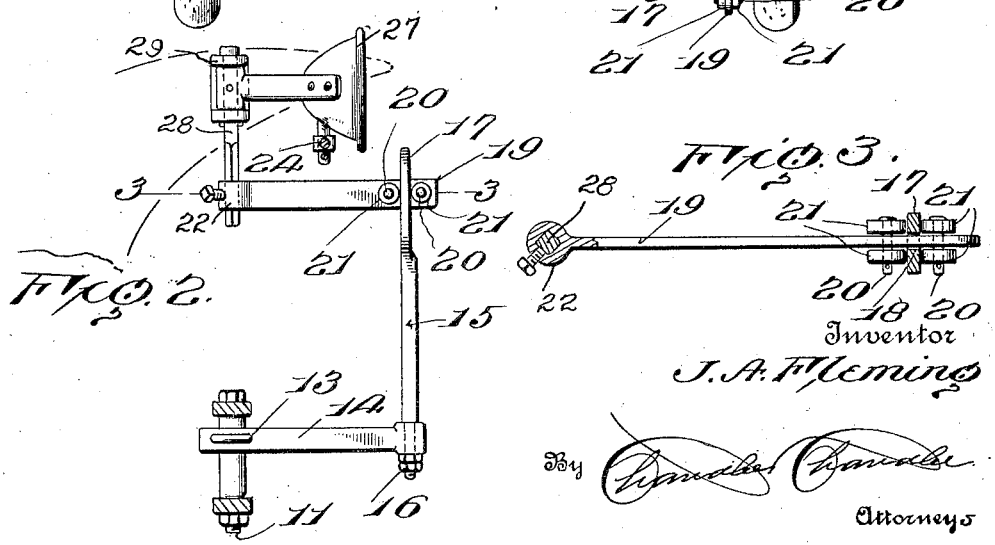

JOHN ALTON FLEMING, OF MASON, TEXAS.

DIRIGIBLE HEADLIGHT.

1,326,587.  Specification of Letters Patent.  Patented Dec. 30, 1919.

Application filed April 12, 1919. Serial No. 289,563.

*To all whom it may concern:*

Be it known that I, JOHN ALTON FLEMING, a citizen of the United States, residing at Mason, in the county of Mason, State of Texas, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in automobile headlights and particularly to mechanisms for steering the same synchronously with the front wheels of the automobile.

One object of the invention is to provide a novel and improved device of this character which can be easily and quickly applied to an automobile and properly connected to the headlights without modifications to the automobile, except the connections to the lamps.

Another object is to provide a novel and improved device of this character which will readily compensate for the relative vertical movements of the chassis and body of the automobile, so that the proper operation of the lamp steering mechanism will be accomplished without danger of bending or breaking of any of the parts thereof.

Other objects and advantages will be apparent from the following description when taken in connection with the accompanying drawing.

In the drawing:

Figure 1 is a front elevation of an automobile equipped with my improved headlight operating mechanism.

Fig. 2 is a vertical sectional view taken on the line 2—2 of Fig. 1, looking toward the left, in the direction of the arrows, to show the manner of connecting certain of the parts to the steering knuckle of the front wheel.

Fig. 3 is an enlarged horizontal sectional view taken on the line 3—3 of Fig. 2.

Fig. 4 is a top plan view of that portion of the mechanism which is connected to the left lamp of the automobile, showing the roller connection between the vertical rod and the horizontal rod which is connected to the lamp.

Referring particularly to the accompanying drawing 10 represents the front axle of the automobile and 11 the vertical bearing sleeves of the steering knuckles of the front wheels 12. Rigidly attached to the sleeve 11 of the knuckle at the right side of Fig. 1, which is the left wheel of the automobile, by means of the U-bolt 13, is a forwardly extending arm 14, the forward end of which is rigidly connected to the lower end of the vertical rod 15, by the bolts 16. The upper end of this rod is slightly widened, as at 17 and is formed with a vertical slot 18 which receives therethrough the adjacent end of the horizontal rod 19. Extending horizontally through the rod 19, on each side of the enlarged upper end of the vertical rod 15, is a short axle 20, the opposite ends projecting beyond the sides of the rod 19 and having rotatably mounted thereon the rollers 21. These rollers bear against the opposite faces of the enlarged end of the rod 15 whereby the rod 19 will be permitted to move bodily vertically, with the body of the automobile, when such movement of the body of the automobile takes place under the influence of the front springs of the vehicle. The other end of the horizontal rod 19 is connected, at 22, to and rotatable with the lamp post 28 carried by the left lamp 27 of the automobile. Also pivotally connected to this post 28 is the adjacent end of a transversely extending rod 24, whose other end is similarly connected to the right lamp of the automobile, at 25, where there is carried the forwardly extending lug 26. By means of this rod 24 the lamps are swung in unison. Each of the lamps 27 is mounted on a vertical post 28 which is supported for rocking movement in the bracket 29 mounted on the mud-guard 30 of the automobile.

Thus, as the steering knuckles are turned in one direction or the other, the forwardly extending arm 14 will be swung around to the right or left carrying with it the vertical rod 15, with the result that the horizontal rod 19 will be moved to swing the adjacent lamp in the direction in which the front wheels of the automobile are turned, and by means of the connecting rod 24 the other lamp will be simultaneously turned in the same direction. This will cause the light from the lamps to be shed on the road around the turn, whereby the driver can readily see whether or not there is another vehicle ahead. Ordinarily the lamps remain stationary and shed their light straight ahead and away from the road, with the result that the driver is entirely ignorant of the condition of the road around the turn. With the present device the driver feels safe when he approaches a turn, because he knows that the road around the turn will be so illuminated that he will have a clear view thereof, and have sufficient time in which to avoid an accident.

What is claimed is:

The combination with a motor vehicle and a steering knuckle, a lamp having a spindle pivotally mounted upon the vehicle, and depending below the pivotal mounting, a forwardly directed arm connected with the depending portion of the spindle and adjustable vertically thereon, the arm having longitudinally spaced rollers at its outer end, and a member connected to and movable with said steering knuckle, and extending forwardly and parallel with the first-named arm and a member connected to and extending upwardly from the forwardly extending member, said upwardly extending member being slotted and receiving in its slot the portion of the arm of the spindle between the rollers of the latter.

In testimony whereof, I affix my signature in the presence of two witnesses.

JOHN ALTON FLEMING.

Witnesses:
 CHAS. HELER,
 GLENN SMITH.